United States Patent [19]

Parker

[11] Patent Number: 4,856,822
[45] Date of Patent: Aug. 15, 1989

[54] FLEXIBLE JOINT FOR CONNECTING TWO PIPES

[76] Inventor: Birch F. Parker, Quarry House, Over Whitacre, Near Coleshill, England

[21] Appl. No.: 97,966
[22] PCT Filed: Nov. 14, 1986
[86] PCT No.: PCT/GB86/00702
§ 371 Date: Jul. 14, 1987
§ 102(e) Date: Jul. 14, 1987
[87] PCT Pub. No.: WO87/03038
PCT Pub. Date: May 21, 1987

[30] Foreign Application Priority Data

Nov. 14, 1985 [GB] United Kingdom ............... 8528105

[51] Int. Cl.$^4$ .............................................. F16L 3/16
[52] U.S. Cl. ...................................... 285/62; 285/166; 285/264; 285/94
[58] Field of Search ................. 285/144, 264, 62, 268, 285/424, 94

[56] References Cited

U.S. PATENT DOCUMENTS

| | | | |
|---|---|---|---|
| 1,742,419 | 1/1930 | Selah | 285/264 |
| 2,502,753 | 4/1950 | Rohn | 285/166 X |
| 2,857,177 | 10/1958 | Loetz | 285/166 |
| 3,695,645 | 10/1972 | Mommsen | 265/166 X |
| 3,695,646 | 10/1972 | Mommsen | 265/424 |
| 4,201,048 | 5/1980 | Fisher et al. | 285/166 X |
| 4,408,785 | 10/1983 | Legios et al. | 285/166 X |
| 4,553,775 | 11/1985 | Halling | 285/166 X |
| 4,570,440 | 2/1986 | Doran | 265/268 |

*Primary Examiner*—Dave W. Arola
*Attorney, Agent, or Firm*—David W. Gee; Erik M. Arnhem

[57] ABSTRACT

A hollow flexible joint (10) for connecting two pipes (6, 8) in an engine exhaust system, which includes two or more tubular coupling members (12, 14) adapted for connection between the pipes (6, 8), the tubular members (12, 14) each being sealingly and pivotally engaged with another tubular member (12, 14), and two of the tubular members (12, 14) being engageable with a respective adjacent end of each of the pipes (6, 8). The joint includes three or more pairs of part-spherical mated sealing surfaces (11a, 11b, 11c), and can remain gas-tight even when one of the pipes (6, 8) articulates universally relative to the other.

4 Claims, 4 Drawing Sheets

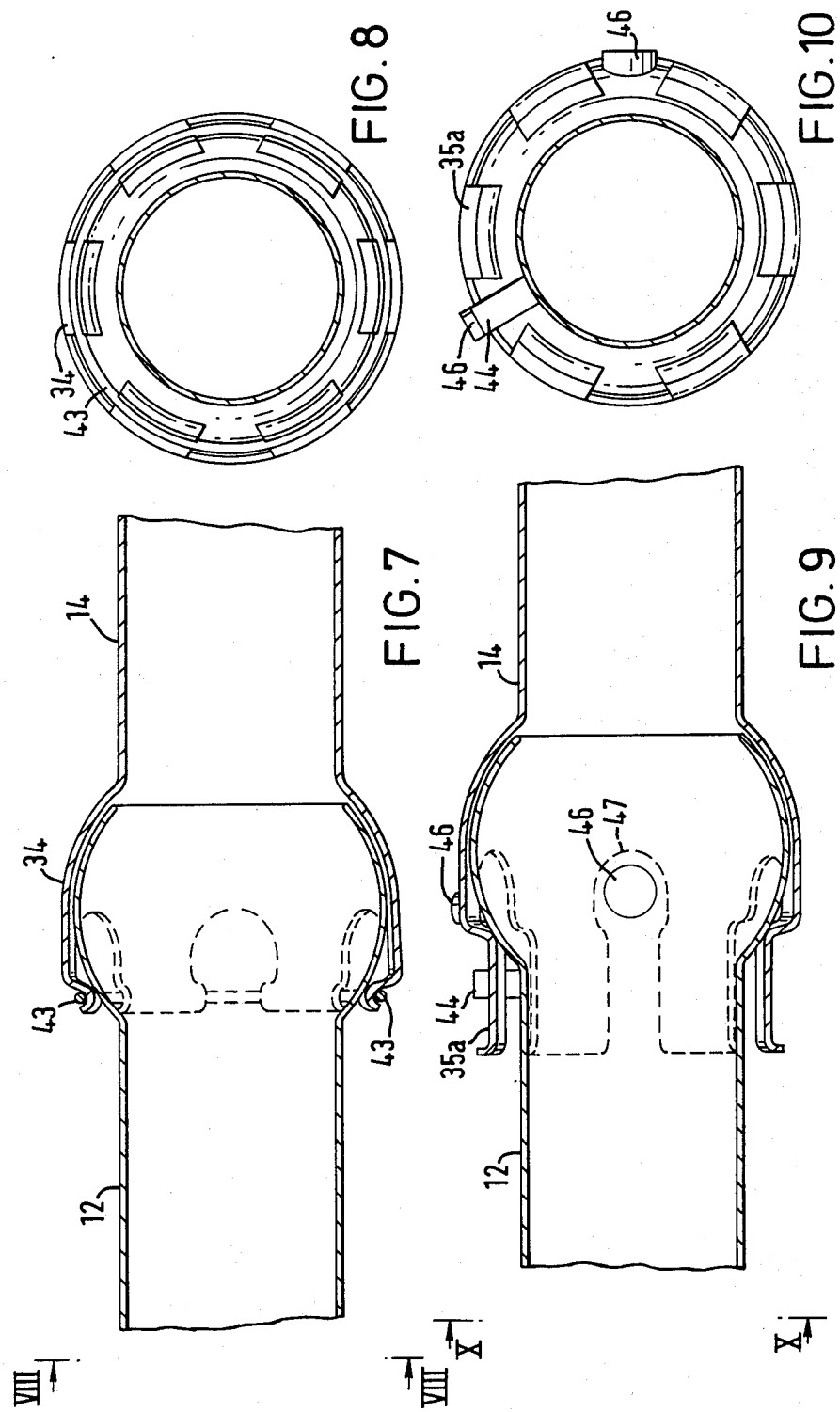

FLEXIBLE JOINT FOR CONNECTING TWO PIPES

BACKGROUND OF THE INVENTION

This invention relates to a flexible joint for connecting two pipes, and in particular to a hollow flexible joint for connecting two rigid pipes in an engine exhaust system.

In for instance a conventional OHV engine, when the exhaust valve opens at the end of the expansion stroke, pressure in the cylinder is still considerably greater than atmospheric. If the exhaust port is allowed to discharge directly into atmosphere, the noise is comparable to that of the gases from behind a bullet in a pistol. Whilst in a multi-cylinder engine the noise can be considerably reduced by discharging all the exhaust pipes into a single branched pipe (manifold) so that the exhaust flow is smoother and more continuous, the noise level still exceeds acceptable levels. The exhaust gases are therefor required to be passed through an exhaust system including a silencer before escaping to atmosphere. Silencing inevitably leads to some loss of engine power because any restriction in escape of the exhaust gases also tends to reduce the amount of fresh charge entering the cylinder. Thus exhaust systems are designs of considerable complexity;; in recent U.K litigation, a major vehicle manufacturer indicated that a successful exhaust system for a new car took six months or more to design.

An engine creates torque, which is reacted by its mounting. To limit damage to the mounting, it is usual to interpose resilient support members between the engine and the mounting, which clearly then permit some movement of the engine. These self-induced engine movements are added to if the engine is a vehicle engine subject also to road vibrations, particularly if the engine is transversely-mounted.

In one known arrangement, currently in use on a small car, and sometimes known as a non-split exhaust system, the exhaust system is rigidly connected to the engine and moves with it; since however the exhaust system is mounted in cantilever and is of a length exceeding 1.5 meters, the system frequently breaks off adjacent the engine connection. In a second used arrangement, the exhaust pipe has a flattened section which acts as a hinge, the rear pipe section being secured to the vehicle chassis and with the front pipe section connected to hingedly-follow the engine movements; but there are frequently early failures due to metal fatigue on the flattened section. In another used arrangement, with a split-exhaust system, the engine and exhaust systems are connected by a flexible pipe comprised of overlapping helically-wound metal strip, which severs and/or separates and then is not gas tight.

There have been a number of prior proposals from the vehicle manufacturers aimed at preventing the engine movements damaging the exhaust system.

Thus Daimler-Benz DOS1526557 showed a pipe connector having spaced part-spherical ends resiliently-biased and/or clamped against mating pipe-ends; but relative lateral pipe end movement increases the distance between the mating parts so that the part-spherical ends either separate from the mating parts or the pipe ends are pulled inwards and the pipes stressed. A subsequent arrangement is that of DE3116290 in which the exhaust pipe and connecting section have overlapping curved flanges. which are clamped in the radial and axial directions by V-shaped clip.

Volkswagenwerk AG have proposed in U.S. Pat. No. 4,223,922 a pipe connection using a spherical sealing surface on one pipe which projects into an axial accommodating space of a mating pipe. In U.S. Pat. No. 4,289,169 an arrangement for multi-passage pipes (that is pipes which have exhaust channels separated from one another to improve the engine performance) is disclosed, also with a spherical mounting. In DOS2353914 a transversely-disposed leaf spring holds the surfaces together. Other disclosures are DOS2716894; DOS2623520; and U.S. Pat. No. 4,181,332.

Chrysler France have proposed in French Publication No. No. 2346631 cooperating male and female connectors, each with deformed spherical ends and so able to articulate, with the connection assured by a resilient coupling; a common resilient couping is shown for twin exhaust systems.

Regie Nationale des Usines Renault in U.S. Pat. No. 4,408,785 show a system for filtering vibrations from an internal combustion engine towards an exhaust pipe. The pipe ends are linked by an internal cylindrical element which is intended to ensure the pipe's continuity with a minimum or charge losses as well as passing along longitudinal compression stress.

SUMMARY

A recognised disadvantage with the known split exhaust system arrangements is that relative movements between the first portion of an exhaust pipe rigidly mounted on or connected to the engine and the second portion mounted on the vehicle body or chassis are eventually followed by damage to the exhaust system such as rupture at the connection, meanwhile with repeated temporary loss of sealing. Specifically, relative axial to-and-fro movement results respectively in joint compression, and in component (first portion/second portion) separations; whilst lateral movements relative to and away from the common pipe axis result in component separation or pipe tension and stresses.

It is an object of my invention to minimise or overcome the disadvantages of the known split-exhaust arrangements, by providing a joint with the inbuilt flexibility and movement capability to connect two pipes or pipe sections which are subject to a (limited-range) universal movement.

Thus according to my invention I provide a hollow flexible joint for connecting two axially-spaced pipes in an engine exhaust system which includes at least two tubular coupling members adapted for connection between the two pipes, each of the coupling members being sealingly and pivotally engaged with another coupling member by a pair of respective internal and external part-spherical relatively-rotatable mating surfaces, two of the said coupling members being engageable with a respective adjacent end of each of the pipes, each pair of mating surfaces having an effective radius about a centre, the distance between the centres of adjacent pairs of mating surfaces being greater than the sum of the radii of adjacent pairs characterised in that the mating surfaces are urged together by a section of each of a plurality of finger-like extensions from the member providing the internal mating surface, and in that the said section of each of the extensions grips an exposed part of the member providing the external mating surface axially to urge the mating surfaces together. Such a joint permits full articulation between the pipes or pipe ends i.e. relative rotation, pivoting or yaw, and/or axial to and fro movement, and so permits a reduction in the stresses in the pipes themselves e.g. in the pipes of an engine exhaust system during the time when the engine is running, and for an exhaust system fitted to a vehicle the extra stresses from ground-induced vibrations.

Whilst the joint will conveniently be of metal, it may be made of other materials able to withstand the particular operation conditions e.g. of temperature and vibration, but which do not now need to withstand all the stresses arising in the known designs. Thus ceramic materials or compositions involving heat-resisting plastics could be used.

The distance between the centres about which adjacent pairs of mating surfaces are developed must be greater than the sum of the radii of the respective pair of surfaces. If that condition is satisfied, the joint can be positioned between any two pipe ends, whatever the relative separation and angular disposition of the pipe ends. The coupling members can have a tubular section between the part-spherical mating surfaces of any length, any cross section and any shape (straight, curved, bent), so that a vehicle designer for instance now has greater freedom in the positioning of the exhaust pipes; or alternatively stated other chassis-mounted components such as the fuel tank can be better sited, since there is no longer the need to first select a suitable minimum-vibration run position for the vehicle exhaust system. A superior vehicle layout and/or exhaust system can thus be designed.

I am aware of the disclosure of British Pat. No. 1357691 of a pipeline for subaqueous operations. The weight and size of pipes, and the disclosed operation underwater, make that arrangement unsuitable for consideration as an engine exhaust component.

BRIEF DESCRIPTION OF THE DRAWINGS

The invention will be further described by way of an example with reference to the accompanying drawings, in which;

FIG. 7 is a more detailed view of an alternative embodiment of the ball joint A, shown in-line for clarity;

FIG. 8 is a view along the line VIII—VIII of FIG. 7;

FIG. 9 is a more detailed view of ball joint B, also shown in-line for clarity; and FIG. 10 is a view along the line X—X of FIG. 9.

DESCRIPTION OF THE PREFERRED EMBODIMENTS

Figure 1:
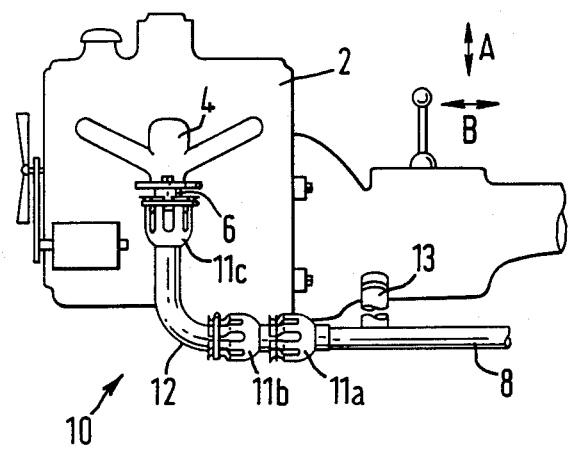
FIG. 1 is a schematic side view of an engine, with part of an engine exhaust system having a flexible joint according to the invention.
Figure 2:
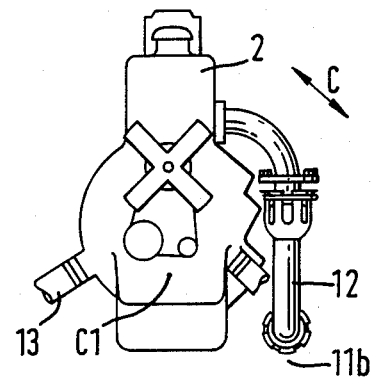
FIG. 2 is a partial front view of the engine of FIG. 1.

For clarity, the mating surfaces in certain of the embodiments are shown spaced apart, but it will be understood that in use they will be in sliding engagement.

The engine 2 (FIG. 1) is a vehicle engine and includes an exhaust manifold 4 to which is bolted a first section 6 of an exhaust pipe. A second section 8 of the exhaust pipe leads to a silencer box (not shown) from which the engine exhaust gases are discharged to atmosphere. The sections 6,8 constitute two pipes (or two pipe ends which can be connected to two pipes); though in an alternative embodiment the first section 6 could be incorporated with the manifold or otherwise connected directly to the engine.

Between the first section 6 and second section 8 is connected a flexible universal joint 10, comprising three ball-and-socket units 11a, 11b, 11c. As shown more clearly in FIG. 5, the units 11a,11b,11c are formed on two intermediate coupling members 12,14 and on end members 15a,15b which respectively fit tightly over first section 6 and tightly within second section 8; though in an alternative embodiment end members 15a,15b are integral with sections 6,8. In a further alternative embodiment there are more than two intermediate coupling members.

As is usual, the engine is resiliently mounted by bearers 13 on the vehicle chassis (not shown) so that its movements will not bend or distort the chassis; such movements arise from engine vibrations i.e. from the engine-generated torque, including that from occasional mis-firing, from operation of the clutch, from vehicle braking, and from the suspension-transmitted vibrations from an uneven road (or other surface). The engine has an effective pivot at C1, and the engine movements result in arcuate movements in the directions of arrows C. These engine movements can be divided into vertical movements in the direction of arrows "A", and horizontal movements in the direction of arrows "B".

Figure 3:
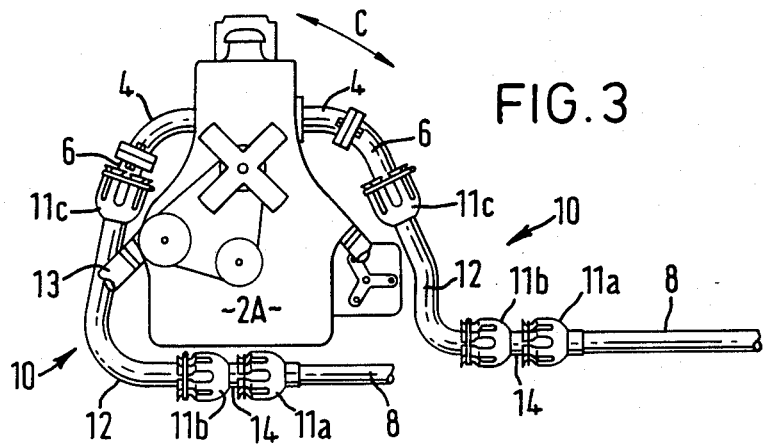
FIG. 3 is a partial schematic side view of a transversely mounted engine, with part of an engine exhaust system having flexible joints according to the invention in alternative pipe runs.

Since in this embodiment, and as is usual, the second section 8 is not rigidly connected to first section 6, the engine movements result in relative movement between the first and second sections 6,8 but universl flexible joint 10 is able to accommodate such relative movements. The relative movements between sections 6,8 are accentuated in a transversely-mounted engine 2A (as shown in FIG. 3/4).

As will be more fully described below, the vertical movements and/or the horizontal movements are accommodated principally by unit 11b of flexible joint 10, with corresponding articulation at units 11a,11c. Since the units are two-part members, with one part of units 11c,11a connected to or integral with pipe sections 6,8, movement of section 6 is not transmitted or not transmitted fully to section 8 i.e. at the designer's discretion, the repeated, small magnitude vibrations of section 6 can be filtered out partially or wholly, with corresponding and repeated movements within the flexible joint 10.

In the embodiment of FIGS. 1/2, as in that of FIG. 3, the intermediate coupling member 12 has a length several times that of the radius of mating surfaces 20,24 and is sharply angled so that unit 11b is not directly below unit 11c; whereas intermediate coupling member 14 has a length in the FIG. 1 embodiment slightly greater than, and in the FIG. 3 embodiment twice as great as, the radius of mating surfaces 26,28 and is straight so that unit 11b is in alignment (at the same level) with unit 11a.

Whilst I have found these general dispositions of units 11a,11b,11c to be suitable for filtering out the horizontal and vertical components of the engine movements before these can be transmitted to pipe section 8, other shapes, sizes and dispositions of the intermediate coupling members are possible provided that the distance between adjacent unit centres is greater than the sum of the radii of the respective mating surfaces.

Figure 4:
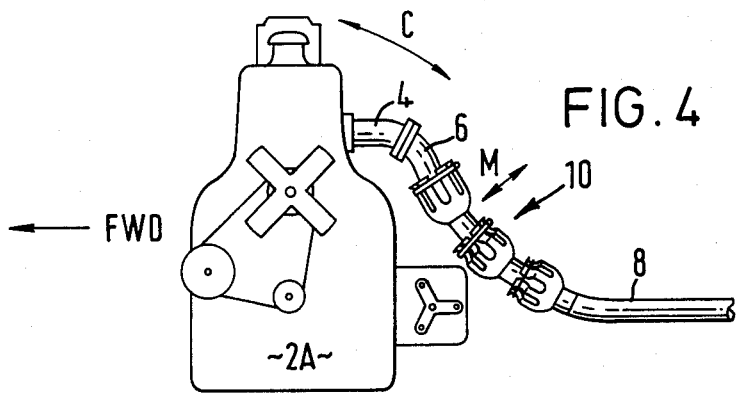
FIG. 4 is a schematic side view corresponding to that of FIG. 3, but with an alternative arrangement of flexible joint.

In the embodiment of FIG. 4, the flexible joint 10 is in the downrun between the exhaust manifold 4 and the second pipe section 8, and as installed has a generally concave attitude.

Figure 5:
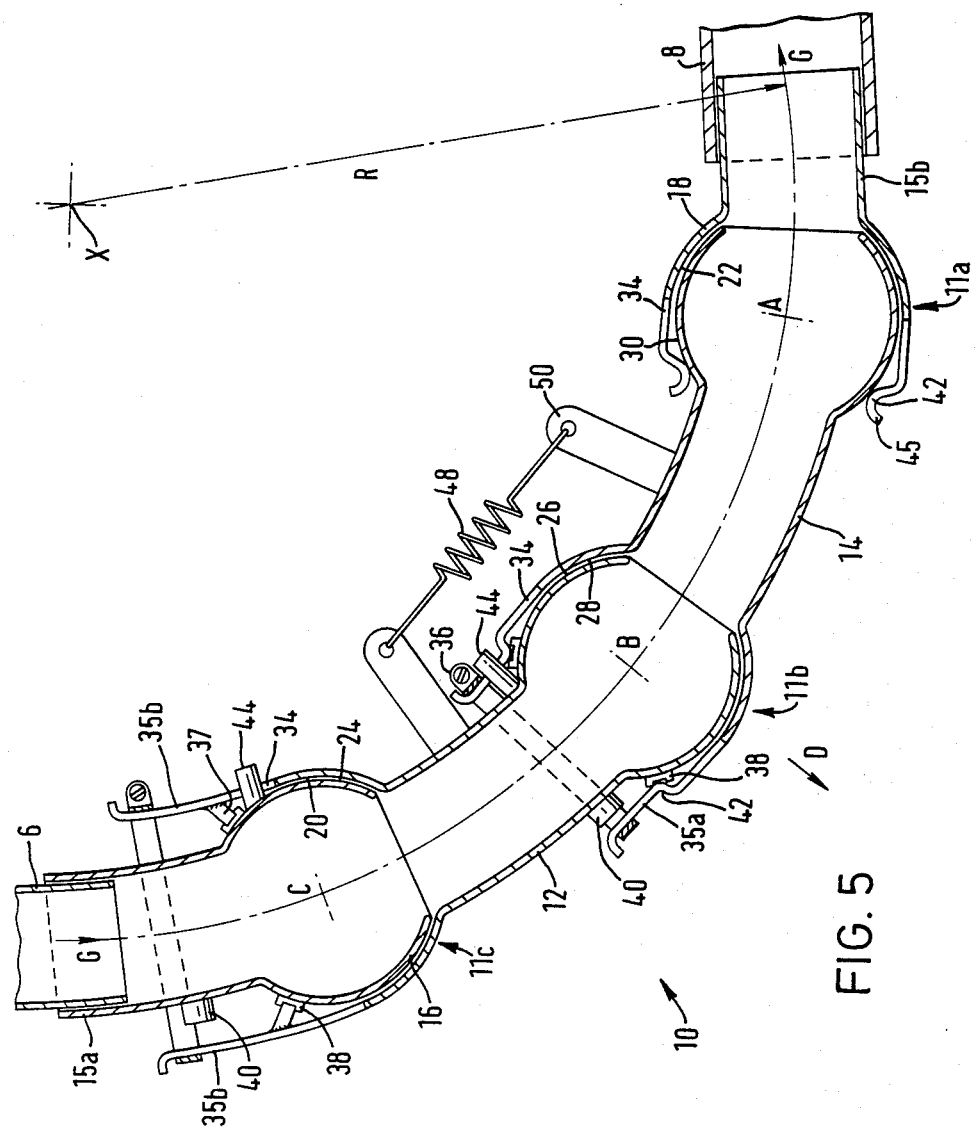
FIG. 5 is an enlarged view of an embodiment of flexible joint according to the invention, with three alternative ball-joint arrangements A,B,C, and showing external spring biassing.

As seen in FIG. 5, between pipe sections 6,8 are coupling members 12,14. Pipe sections 6,8 are connected to end members 15a,15b which have respective part-spherical bulbous and cup-like ends 16,18 with respective external mating surface 20 and internal mating surface 22. Coupling member 12 has part-spherical ends with an internal mating surface 24 of the same effective radius as that of surface 20, and has at the opposite end an external mating surface 26. Coupling member 14 also has a pair of part-spherical ends with one end having an internal mating surface 28 and the other end an external mating surface 30, the mating surface 28 having the same effective (sliding) radius as mating surface 26 and the mating surface 30 having the same effective (sliding) radius as mating surface 22. Thus the surfaces 20,24; 26,28; and 30,22 can slide one relative to the other in rotation and in pitch and yaw, whilst maintaining a close fit to ensure a continuing hot gas seal.

In an alternative embodiment, the radii of surfaces 20,24 need not be the same as the radii of surfacse 26,28 or of surfaces 30,22. In a further alternative embodiment, the coupling members 12,14 can have two internal mating surfaces or two external mating surfaces providing the male/female coupling is retained; however I prefer an embodiment such as that of FIG. 5, where the gas flow is in the direction of arrow G, so that for the gas to penetrate between the mating surfaces it first has to effect a U-turn, and is therefore less likely to cause a temporary gas escape.

In the embodiment of FIG. 5, the flexible joint has an axis centered on X, and a radium R and so is generally concave. The pairs of mating surfaces in the rest or neutral position of FIG. 5 are so angled and arranged that the axes of the mating part-spherical ends are in alignment i.e. the maximal gas flow section is maintained. In an alternative embodiment, these axes (of the part-spherical ends) are angled to the longitudinal axes of the pipes and coupling members, with successive axes angled in the same sense so that the flexible joint 10 is again generally concave. It will be understood that if pipe sections 6,8 move apart, the flexible joint 10 tends to straighten i.e. become less concave; whereas if the pipe sections 6,8 move towards one another, the flexible joint 10 becomes more concave, as by surface 28 pivoting on surface 26 with the part-spherical ends moving in the direction of arrow "D" to increase the angle between the longitudinal (straight or curved) axes of the coupling members. Thus the flexible joint accommodates relative axial movements without the parts needing to separate, or to compact together.

Though the internal shape of end(s) 16 is also part-spherical, in an alternative embodiment the internal shape could be e.g. cylindrical, perhaps by the inclusion of insert members, to assist streamlined gas flow and/or to assist gas sealing and/or to limit solid deposition from the gas stream at the mating surfaces. Thus the internal contour of the pipe need not follow the external contour of the bulbous end.

Though the bulbous and cup-like ends 16,18 can be connected by extending the external cup-like ends over-centre and swaging about the bulbous end, such a connection is often too loose for adequate gas stealing, and can rattle to the annoyance of the vehicle occupants either "as made" or after wear at the "mating" surfaces. Thus in the arrangements A,B,C shown in FIG. 5 the sealing contact between surfaces 20,24; 26,28; and 30,22 is effected by finger-like extensions 34 from the part providing the internal mating surface (24,28,22). Those extensions have an inbuilt spring resilience and so exert an external pressure on the part providing the corresponding external mating surface (20,26,30), i.e. acting as leaf springs urging the surfaces together so as to limit rattle, and to take up wear.

The finger-like extensions 34 can be formed integrally or can be manufactured separately and secured as by welding. As seen for arrangement A, the outer or female part-spherical member has the resilient finger-like extensions 34, each with a cranked section 42. The cranked sections 42 abut an exposed part of surface 30 to urge surfaces 30,22 into mating engagement. The cranked sections 42 can be held tightly, if required, to prevent unwanted separation of the male and female parts, by a wire 43 (FIG. 7) around the cranked section 42, the wire being located by outwardly-directed piece 45. If required, means can be provided to alter the tension in wire 43.

In arrangement 3, each extension 34 has an extension part 35a; the extension parts 35a can be urged inwardly to increase the sealing force between the mating surfaces by using an adjustable worm drive clip 36, or equivalent. To prevent excessive flexure of extension parts 35a e.g. when taking up wear, pads 38 are positioned beneath each cranked section 42, the pads having recesses in their outer surfaces into which the cranked section 42 projects to locate each respective pad. As seen, the pads have a part-spherical inner surface, of a curvature corresponding to that of the exposed part of surface 26. In an alternative embodiment the pads can be replaced by a split washer, again with a part-spherical inner surface and indentations on the outer surface.

In arrangement C, each extension part 35b is of extended length and carries inwardly-porjecting toes 37, which engage in the respective pad indentation. The toes 3 by way of the pads 38 provide an axial bias to urge the mating surfaces together, i.e. they replace the cranked sections 42.

If in FIG. 5 the pipe sections 6,8 move axially apart, the unit 11b moves in the direction opposite to that of arrow "D". It is desirable to limit the permitted movement in this direction so as to ensure that the gas flow passage is not restricted, or unduly restricted and to ensure that the joint does not lock in an in-line condition (of units 11a,11b,11c). Thus below extension parts 35a,35b there is a buffer 40, which when abutted by an extension part prevents further articulation in that direction. It is also desireable for the same reason to limit the permitted relative rotational movement (about the unit longitudinal axis), and so between extension parts 35a, or extension parts 35b, there is an upstanding abutment 44. In an alternative embodiment, there may be more than one buffer and/or abutment. The buffers and abutments are secured to an extension of the part providing the female mating surface; though in an alternative embodiment they are carried by the extension parts 35a,35b.

In a preferred embodiment one member may act as both buffer and abutment. Thus as seen in FIGS. 9/10 a circular upstanding abutment formed as a peg 46 is welded to an exposed part of the surface 20,26,30, near the roots 47 of a pair of adjacent finger-like extensions 34. In an alternative embodiment, abutment peg 46 is positioned nearer to one extension 34 than the other. Upon excess articulation in the direction of arrow "D", peg 46 is engaged by roots 47 of extensions 34, which form an end stop; and peg 46 can also prevent excess relative rotation.

In embodiments subject to possible greater than usual relative axial movements between pipe ends 6,8, it may also be desireable to affix buffers 40 or 46 so as to prevent movement greater than a pre-selected amount in the direction of that of arrow "D".

As seen in FIG. 5 there is a coil spring 48 connected between arms 50 welded respectively to coupling members 12,14, which can help return unit 11b to the neutral or out-of-line attitude; and which can inhibit articulation of unit 11b towards the in-line position. As in some of the prior art disclosures, the spring 48 can help maintain faces 26,28 in mating engagement.

Figure 6:
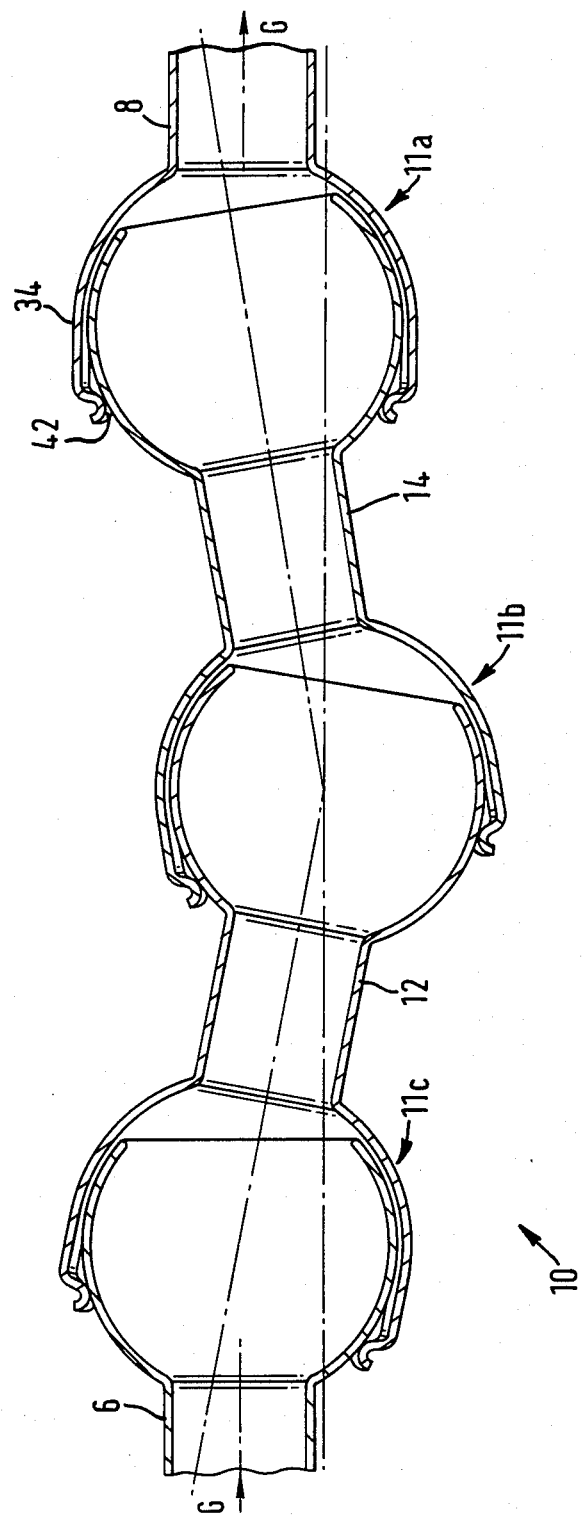
FIG. 6 is a schematic arrangement of a joint according to the invention connecting two in-line pipes.

For connecting between in-line pipe sections, as in the embodiment of FIG. 6, I prefer units 11a,11b,11c which are enlarged relative to the pipe diameter (if pipe connections 6,8 are round) or dimension; as shown, the longitudinal axes of the coupling members are off-set at less than 10 degrees from the longitudinal axes of the sections 6,8. To avoid possible partial closure of the gas passage, the cup or female parts of each unit are cut back as compared to the other embodiments. In an alternative embodiment, arrangements B/C with buffer 40 or peg 46 can be used.

The pairs of part-spherical bearing surfaces may be coated with a sealing compound, preferably one having anti- friction properties to improve or at least not inhibit relative sliding. In an alternative embodiment, the sealing compound can be injected between the surfaces; and for this purpose in an alternative embodiment a seal-material nipple can be provided on the outer bearing member; or in arangements where the bearing members can be removed from between the pipe sections and pivoted beyond their normal attitude so as to expose the mating surfaces, the sealing compound can be applied directly. I have found a suitable sealing compound to be a graphite-based paste such as that sold under the trade name "DRYLUBE" and supplied by Revol Ltd of Newcastle upon Tyne, England.

The flexible joint 10 of my invention may be made as a sub-assembly and supplied to the vehicle manufacturers for them to insert between fitted pipe sections 6,8. Alternatively, the joint 10 may be fitted as a replacement item.

I claim:

1. In a vehicle, an improved hollow flexible joint connected between the ends of two tubular exhaust pipes and permitting relative angulation therebetween, which includes:
   a first tubular coupling member having a part-spherical end providing an external mating surface;
   a second tubular coupling member having a part-spherical end providing an internal mating surface, the internal mating surface being of the same effective radius as said external mating surface, the said mating surfaces being adapted both to mate and pivot one relative to the other;
   a plurality of resilient finger-like extensions projecting from said second tubular coupling member around part of the part-spherical end of the first coupling member,
   a force-transmitting pad located by each finger-like extension against the part-spherical end of the first tubular coupling member,
   said extensions each having a section which exerts by way of said pad a force externally on the part-spherical end of the first tubular coupling member in a direction to urge said mating surfaces into sealing engagement,
   the remainder of the extensions being spaced outwardly from the part-spherical end of the first tubular coupling member;
   an extension part on each of the finger-like extensions;
   and means to urge each extension part inwardly towards the first tubular coupling member to increase the force urging the said mating surfaces into sealing engagement.

2. In a vehicle, an improved hollow flexible joint connected between the ends of two tubular exhaust pipes and permitting relative angulation therebetween, comprising:
   a first axially-extending tubular coupling member having a bulbous end providing an external mating surface;
   a second axially-extending tubular coupling member having a cup-like end providing an internal mating surface, the said internal mating surface being pivotally and sealingly engaged with said external mating surface;
   a plurality of resilient fingers extended axially from the second tubular coupling member, and spaced around part of the bulbous end of the first tubular coupling member;
   an extension part on each of the fingers, each said extension part being alongside but radially spaced from a part of the first tubular coupling member;
   a pad located between and engaging a finger and an exposed part of the bulbous end of the first coupling member spaced from the external mating surface; and
   means to vary the spacing between each said extension part and the first tubular coupling member to vary the force applied to the said exposed part of the first tubular coupling member and hence between said mating surfaces, said force having an axially-directed component transmitted to said exposed part by way of the pad.

3. In a vehicle, an improved hollow flexible joint connected between the ends of two tubular exhaust pipes and permitting relative angulation therebetween, comprising:
   a first tubular coupling member with an enlarged end of part-spherical shape;
   a complementary tubular coupling member also having an enlarged end of part-spherical shape and connected to said first tubular coupling member by the coupling of said ends, with at least part of the first
   coupling member being within the complementary coupling member, the first tubular coupling member being movable within said complementary tubular coupling member until said ends are sealingly and pivotally engaged;

extensions from said complementary tubular coupling member extending alongside but externally of and spaced from the enlarged end of the first coupling member;

a plurality of pads releasably located against an exposed surface of the enlarged end of the first tubular coupling member, each respective pad being so located by a respective one of the said extensions, each said pad being slidable upon and relative to said exposed surface as the first tubular coupling member moves further within the complementary tubular coupling member;

an extension part for each of said extensions, said extension parts extending alongside but externally of and spaced from the first coupling member; and means to draw in the extension parts towards the first tubular coupling member to exert increased pressure on each respective extension to increase the sealing engagement between the said ends, and to cause the pads to follow movement of the first tubular member into the complementary tubular coupling member during take-up of wear.

4. In a vehicle, an improved hollow flexible joint connected between the ends of two tubular exhaust pipes and permitting relative angulation therebetween comprising:

two terminal tubular coupling members, each having at one end an enlarged portion and at the other end a non-enlarged portion, the said non-enlarged portions being sealingly engaged with the respective ends of the two tubular exhaust pipes, the enlarged portion of one of the two terminal coupling members including an external mating surface and the enlarged portion of the other of the two terminal coupling members including an internal mating surface;

two intermediate tubular coupling members, each having at each end an enlarged portion, the enlarged portion at one of said ends including an internal mating surface and the enlarged portion at the other of the said ends including an external mating surface;

wherein the external mating surface of the said one of the two terminal coupling members sealingly and pivotally mates with the internal mating surface of one of the two intermediate tubular coupling members to form a first pair of mating surfaces, and the internal mating surface of the other of the two terminal tubular coupling members sealingly and pivotally mates with the external mating surface of the other of the two intermediate coupling members to form a second pair of mating surfaces;

and wherein the external mating surface of the said one of the two intermediate coupling members is sealingly and pivotally engaged with the internal mating surface of the said other of the two intermediate coupling members to form a third pair of mating surfaces;

means to urge each of the respective pairs of mating surfaces into sealing engagement, said means including resilient finger-like extensions from each coupling member including an internal mating surface;

a pressure pad between each of said extensions and an outwardly curving segment of the enlarged portion including an external mating surface, the respective extension applying pressure by way of the pressure pad;

means to adjust the pressure applied by way of the pressure pad;

abutment means carried by that coupling member of a pair having the external mating surface, the abutment means being located between two adjacent finger-like extensions to limit relative rotational pivoting of said pair of mating surfaces;

wherein said first, second, and third pairs of mating surfaces are in non-rectilinear array, movement of the ends of said two tubular exhaust pipes closer together increasing the non-rectilinearity, continued movement of said ends when the abutment of one of said pairs is engaged causing pivoting and/or rotational movement in another of said pairs without destroying the gas-tightness of the joint.

* * * * *